(12) United States Patent
Vylimec et al.

(10) Patent No.: US 10,773,415 B2
(45) Date of Patent: Sep. 15, 2020

(54) METHOD OF PRODUCTION OF FIRE IMPREGNATION SUBSTANCE, MAINLY FOR CONSTRUCTION PRODUCTS, FIRE IMPREGNATION SUBSTANCE AND USE OF THEREOF

(71) Applicant: MOVYCHEM, S.R.O, Mocenok (SK)

(72) Inventors: Jiri Vylimec, Mocenok (SK); Roman Magdina, Prievidza (SK)

(73) Assignee: Movychem, S.R.O, Mocenuk (SK)

( * ) Notice: Subject to any disclaimer, the term of this patent is extended or adjusted under 35 U.S.C. 154(b) by 49 days.

(21) Appl. No.: 16/092,785

(22) PCT Filed: Apr. 15, 2017

(86) PCT No.: PCT/IB2017/052181
§ 371 (c)(1),
(2) Date: Oct. 11, 2018

(87) PCT Pub. No.: WO2017/179029
PCT Pub. Date: Oct. 19, 2017

(65) Prior Publication Data
US 2019/0118407 A1    Apr. 25, 2019

(30) Foreign Application Priority Data
Apr. 16, 2016   (SK) .................................. 50019-2016

(51) Int. Cl.
*B27K 3/15* (2006.01)
*C09D 5/18* (2006.01)
*C08G 79/04* (2006.01)

(52) U.S. Cl.
CPC .............. *B27K 3/153* (2013.01); *C08G 79/04* (2013.01); *C09D 5/185* (2013.01); *B27K 2200/10* (2013.01); *B27K 2240/30* (2013.01)

(58) Field of Classification Search
CPC ............................ B27K 3/153; B27K 2200/10; B27K 2240/30; C09D 5/185; C08G 79/04
See application file for complete search history.

(56) References Cited

U.S. PATENT DOCUMENTS 6,425,947 B1 * 7/2002 Berlin ................... C09D 5/185
                                                          106/18.12

FOREIGN PATENT DOCUMENTS

| CN | 101412230 | 4/2009 |
|---|---|---|
| CN | 101412231 | 4/2009 |
| CN | 101838482 | 9/2010 |
| CN | 102910865 | 2/2013 |
| CN | 103666268 | 3/2014 |
| EP | 1136529 | 9/2001 |
| EP | 2678394 | 1/2014 |
| WO | WO2016170469 | 10/2016 |
| WO | WO2016/207870 | 12/2016 |

* cited by examiner

*Primary Examiner* — Andrew J. Oyer
(74) *Attorney, Agent, or Firm* — Defillo & Associates, Inc.; Evelyn A Defillo

(57) ABSTRACT

Fire impregnation substance is produced by polymerization of non-toxic components in such a way that pentaerythritol (5% to 90% of the mass) and ammonium polyphosphate (5% to 90% of the mass) are added to the water (30% to 96% of the mass) with temperature from 5° C. to 98° C. and the solution is mixed until it is pure. The mutual ratio of the components of pentaerythritol and ammonium polyphosphate can range from 1:18 to 18:1 During the production of the cellulose product or fibrous wood products such as chipboards or particle boards the wood chips or sawmill shavings are dipped in the impregnation substance before connecting and pressing, or the impregnation substance is added to adhesive or binder, respectively, which coats the chips or shavings before pressing into desired product. The cores of microintumescence inside the material, mainly on surfaces of the original chips, shavings or fibers subsequently produce gradually activate layers preventing the permeation of the fire's effects.

15 Claims, No Drawings

METHOD OF PRODUCTION OF FIRE IMPREGNATION SUBSTANCE, MAINLY FOR CONSTRUCTION PRODUCTS, FIRE IMPREGNATION SUBSTANCE AND USE OF THEREOF

CROSS REFERENCE TO RELATED APPLICATION

This application is a national stage entry of PCT/162017/052181 filed Apr. 15, 2017, under the International Convention claiming priority over Slovak Patent Application No. 50019-2016 filed Apr. 16, 2016.

FIELD OF TECHNOLOGY

The invention concerns the method of production of fire impregnation substances in liquid form. The impregnation substance is not toxic, it has significant adhesive effects and it is transparent, and its advantage is that it can be used for impregnation of the construction products or construction semi-finished products, respectively, in various phases of their production or installation.

PRIOR STATE OF THE ART

Various fire-resistant additives and surface fire resistant layers are used during the production of construction materials. Solutions are known where various dangerous substances for example, halogens such as bromine or chlorine are used as fire retardants. Such retardants are harmful to health, and mainly during the long-term exposition they can degrade the original physical-mechanical features of the basic material.

Intumescent additives are know; these increase the fire resistance in such a way that they create a surface foaming which serves as a heat isolation. Usually, the intumescent additives are formed by a carbon source for the foaming, acid producing compound, and compound whose decomposition produces gases. Intumescent films are used as surface layers in outer surfaces of the construction products. After the penetration of the fire inside the material the intumescent films loose their effect. The disadvantage of the known intumescent films is also the coloring of the surface of the construction product, which often runs counter to aesthetic and design demands.

Use of ammonium polyphosphate and melamine in preparations for increase of the fire resistance is known. The effects of these substances in the independent fire resistant applications are already examined. These substances are in the applications known as insoluble powders, which limits their application possibilities.

Publication U.S. Pat. No. 6,425,947 B1 discloses the substance with fireproof or heat isolation effect applied onto surface of the wood or metal, whereby the substance contains pentaerythritol, ammonium polyphosphate, urea and boric acid in a resin base. The resulting product can be harmful to health and it is only designed for surface application. Technical solution according to CN103666268 (A) discloses use of ammonium polyphosphate, melamine and pentaerythritol in pressure coating of wood products. The pressure application can increase the saturation of the surface layer of the wood, but it does not ensure the penetration to the whole volume of the construction product. This solution as well as other publications CN102910865 (A), CN101412231 (A), CN101412230 (A), and CN101838482 (A) uses fireproof mixtures, but except for ammonium polyphosphate and pentaerythritol it contains other substances, usually without mutual strengthening of the effect. Higher amount of components causes complications when assessing the health effects of the mixture.

The goal of the proposed invention is the production of the polymer which only contains substances without health hazards pursuant to hitherto known research studies. The components entering the polymerization process should be commercially available with appropriate environmental classification in REACH (European Regulation on Registration, Evaluation, Authorization and Restriction of Chemicals) and the resulting substance should have good adhesion to fibrous wood materials, such as chipboard or particle board.

ESSENCE OF THE INVENTION

The abovementioned deficiencies in the prior state of the art are significantly remedied by the method of production of a fire impregnation substance, mainly for construction products, for retardation and/or prevention of the fire according to this invention, whose essence lies in the fact that pentaerythritol and ammonium polyphosphate in powder form are poured to the water with temperature from 64° C. to 98° C. and the mixture is mixed to the state of the decomposition of the components when their polymerization starts. Pentaerythritol and ammonium polyphosphate can be poured into the water individually, or both components in powder form can be firstly mixed into a homogenous mixture and then they can be poured into the water together. A method is possible where pentaerythritol and ammonium polyphosphate are poured to the water with temperature less than 64° C. and the solution is then heated to 64° C. subsequently.

It is preferable if the temperature of the solution is kept at 70° C. during the polymerization of pentaerythritol and ammonium polyphosphate. A method proved to be advantageous where pentaerythritol is first poured into the water during continuous mixing, the solution is the gradually heated to 70° C., ammonium polyphosphate is then poured into solution during intensive mixing and solution is then gradually heated to temperature up to 98° C. The solution is then left to cool.

Two components added to the solution can have subsequent mutual ratio (excluding water):
ammonium polyphosphate from 5% to 90% of the mass;
pentaerythritol from 5% to 90% of the mass.

The water which creates an environment for the polymerization of the components forms 30% to 96% of the mass of the total solution at the beginning of the process.

Ammonium polyphosphate $[NH_4PO_3]_n$ is used as food additive, emulsifier (E545). It is also known fire retardant for polyolefins and polyurethanes.

Pentaerythritol,2,2-Bis(hydroxymethyl)1,3-propanediol, $C_5H_{12}O_4$, CAS 1 15-77-5, is white crystalline powder, tetravalent monotopic alcohol. It is used for the production of alkyd resins, emulsifiers, explosives, coatings, synthetic lubricating oils. It is considered to be an ecologic alternative to polychlorinated biphenyls (PCB).

A polymerization takes places in the solution with two substances ammonium polyphosphate and pentaerythritol which results in fire resistant polymer with especially high fireproof effect. During the polymerization the chemical bonds with the resulting effect of the mutual support are created; their basic features are supplied when loaded by the radiating heat or flame. The resulting solution is adhesive; at touch and visually it is an oily mass with a viscosity varying pursuant to the used mass ratios. During the eventual drying of the solution the crystals are produced.

The impregnation substance has high fireproof effect; the solution together with organic and inorganic substances produces depending on pH the inner intumescence under the effect of the radiant heat or direct fire; the cores of microintumescence are created in the mass of the polymer. The typical intumescence is manifested by foaming on the surface of the mass, which is usually connected with the loss of the original mechanical features of the mass. With impregnation substance according to this invention a phenomenon has been perceived where there are little cores created in the mass of the polymer, whereby local inner intumescence takes place around them; this intumescences' size corresponds to the small dimension of the cores and thereby the inventors have called this phenomenon "microintumescence". The fire resistant impregnation substance prevents the process of burning also by the fact that $CO_2$ and nitrogenous gases are released around the cores in the mass under the influence of the heat.

The combination of two abovementioned effective substance in the resulting polymer not only causes the achievement of the high fire resistance, but thanks to microintumescence the polymer has mechanical features that are similar—almost unchanged relative to—the original mechanical features even after being exposed to fire.

Impregnation substance according to this invention is transparent and clear, since it does not affect the basic material of the construction product by its color. In case of use of the impregnation element for the fibrous wood materials the aesthetic outer impression of the wood is either preserved or the visibility of wood structure is even increased.

The crucial feature of the impregnation substance according to this invention is its adhesiveness and its ability to soak into the construction material—mainly wood and cellulose—without the need for pressure action. At the same time, pressure or vacuum application, respectively, of the fire resistant impregnation substance according to this invention is still possible.

Both entry substances as well as the resulting product are classified in REACH as substance without harmful effects on the man's health. That means that such a method has been invented, where the process of polymerization and combination of the safe substances leads to increase of the fire resistance at low costs and low energy demands. The invention has high fireproof effects and does not use toxic substances.

The deficiencies in the prior state of the art are significantly remedied by the fire impregnation substances itself, too, mainly for the construction products, for retardation and/or prevention of the fire, according to this invention, which essence lies in the fact that it contains a polymer from pentaerythritol and ammonium polyphosphate dissolved in water which forms 30% to 96% of the mass of the total solution.

The mutual ration of pentaerythritol and ammonium polyphosphate substances before their polymerization can range from 1:18 to 18:1. The preferable range of the mass ratios is from 1:2 to 2:1, where the polymer with longer chain is produced.

The use of the fire impregnation substance according to this invention is also new. The fire impregnation substance does not have to be applied only on the surface of the final construction product; it can be preferable used during the production of the construction product, mainly during the production of the fibrous wood products such as chipboards or particle boards. Before the connection and pressing, the chips or sawmill shavings are dipped in the fire impregnation substance according to this invention, or the impregnation substance is added to glue or adhesive, respectively, which coats the chips or shavings before they are pressed into the required product.

This brings about further synergetic effect according to this invention; the fire impregnation substance increases the strength and solidity of the fibrous wood construction product by its adhesiveness. The construction product receives better mechanical features, which is substantial advantage of this invention, since hitherto known fire impregnation substances and methods either did not affect the mechanical features, or they outright worsened them. The adhesive effects of the fire impregnation substance cause better connection of the individual shavings, chips or fibers in the final construction product. The use of the fire impregnation substance during the production of the fibrous wood products and cellulose products, mainly boards, plates, OSB (oriented strand board), is compatible with the current technological method. The production of the fibrous wood products usually involves pressing during the heat when the wood and fibrous segments of various sizes are exposed to pressure, whereby the increased temperature (for example 174° C. to 190° C.) in the press activates the glue or binder. During the inventing of the fire impregnation substance it has been found out that these temperatures does not active the intumescence or microintumescence process of the fire impregnation substance, but on contrary they active the increase in its adhesiveness. This is manifested by the improved mechanical features of the products as well as in the decrease of the reverse springing of the boards after pressing. Both manifestations are highly desired. Getting the high adhesive power of the fire impregnation substance after its activation by the heat at temperatures that are lower than the temperature that activates the intumescence or microintumescence, respectively, is important inventive benefit. The heating of the fire impregnation substance in the press can cause slight darkening or tanning of the wood, which is, however, visually acceptable and it can be used for the subsequent visual control of the process.

The soaking of the shavings, chips or fibers before their connection and pressing into the final construction product brings another advantage in that the fire resistant substance is not distributed on the surface of the product, but it is basically evenly distributed in the whole volume of the material. With relatively thin construction materials such as boards or plates this significantly increases their fire resistance. The cores of the microintumescence inside the material, mainly on the surfaces of the original chips, shavings or fibers, create the subsequently activated layers preventing the penetration of the fire even in situation where the outer surface is not sufficiently protected by foaming.

Microintumescence according to this invention fills in the microscopic gaps between shavings, chips or fibers of the wood product, which prevents the penetration of the fire further. It is known that massive wood, mainly hard wood has good fire resistance at sufficient width. In case of the fibrous wood products the fire resistance is significantly lowered, which is explained as a result of creation of microscopic gaps between the particles of the processed wood. Not even increased pressure during pressing is capable of eliminating the presence of such gaps, which can be seen from the outside on the lower weight of the resulting material. The use of the fire impregnation substance according to this invention allows achieving high fire resistance—surpassing the fire resistance of the massive wood—without changes in the technology of the pressing. The gaps created in the fibrous wood material and cellulose during the production of the construction product are in the case of fire filled in by the microintumescence.

The advantage of this invention is also the maintaining of the outer appearance and color of the construction products, in form in which the consumers are used to them.

EXAMPLES OF REALIZATION

Example 1

In this example the fire impregnation substance is produced in following way. 1.5 kg of the powder pentaerythritol is poured to the water with temperature 20° C. The solution is continuously mixed and heated to the temperature 70° C., when 2 kg of the ammonium polyphosphate in powder form is slowly poured into the solution during intensive mixing. Then the solution is heated to 94° C. After reaching this temperature in whole volume of the solution, the heating is stopped and mixing continues until the solution is cleared; the solution is then left to cool.

The fire impregnation substance in this example has been used to produce OSB. The shavings prepared by the hitherto known technology are dipped in the pressureless bath, whereby the weight gain of dry matter achieves 20%. The shavings are then processed by standard method, which is preferable from the point of view of low costs. When the humidity of the shavings ranges from 6 to 8%, isocyanate adhesive is used. The application of the adhesive to the shavings is approximately 3%. After the pressing of the shavings to boards there is a very low reverse springing—less than 1%. Fire impregnation substance not only has fireproof function, but it also increases the solidity and strength of the fibrous wood boards. In this example the bending strength of 14 MPa, the transverse tensile strength of 1.3 MPa and a flexural modulus of 3400 MPa have been measured at normal volume weight of the boards 640 kg/m³.

Example 2

Powder pentaerythritol is mixed dry with powder ammonium polyphosphate in mass ratio 1:1. The components are mixed until they produce homogenous mixture. This is slowly poured into the water with temperature ranging from 65° C. to 70° C. During the pouring of the mixture to the water mass ratio of the components—pentaerythritol:ammonium polyphosphate:water—is 1:1:2. In water environment a monomeric reaction takes placed, which can be supported by heating until 98° C. The liquid is mixed until the pure solution is achieved, which is a manifestation of the finished polymerization in the significant volume of the solution. The fire impregnation substance can be used to produce adhesive bridge on the surface of the fibrous wood boards. It is applied by spraying or dipping.

Example 3

Powder pentaerythritol is mixed dry with powder ammonium polyphosphate in mass ratio 1:2. The components are mixed until they produce homogenous mixture. This is slowly poured into the water with temperature 25° C. During the pouring of the mixture to the water mass ratio of the components—pentaerythritol:ammonium polyphosphate:water—is 1:2:3. After the pouring of the components to the water the solution is intensively mixed and heated to 70° C. to 75° C. After achieving pure state, the solution is mixed for further at least 5 minutes and then it is left to cool.

After cooling the substance is added as a component to adhesive which is used during finger jointing of the wooden beams. The resulting beam not only has higher mechanical strength, but the joint of individual segments is more resistant to disjointing even during fire. The segments from the massive wood themselves are highly fire resistant.

INDUSTRIAL APPLICABILITY

Industrial applicability is obvious. According to this invention it is possible to industrially and repeatedly produce and use fire impregnation substance which has no toxic components, which improves the strength of the fibrous wood products, and which is very effective and resistant against radiant heat or direct fire.

The invention claimed is:

1. A method of production of a fire impregnation substance for construction products, for a retardation, and/or prevention of a burning, the method comprising the steps of:
   mixing a solution containing pentaerythritol in a powder form and ammonium polyphosphate in a powder form in a water at a temperature 64° C. to 98° C., until components dissolve, whereby a polymerization of pentaerythritol and ammonium polyphosphate occurs.

2. The method of the production of the fire impregnation substance according to claim 1, wherein the solution is mixed until homogenous.

3. The method of the production of the fire impregnation substance according to claim 1, wherein the pentaerythritol and the ammonium polyphosphate are poured individually to the water during continuous mixing.

4. The method of the production of the fire impregnation substance according to claim 1, wherein the pentaerythritol and the ammonium polyphosphate are firstly mixed together into a homogenous mixture and then poured into the water together.

5. The method of the production of the fire impregnation substance according to claim 1, wherein the solution is mixed and continuously heated to 98° C.

6. The method of the production of the fire impregnation substance according to claim 1, wherein the ammonium polyphosphate forms 5% to 90% of the mass of the components added to the water.

7. The method of the production of the fire impregnation substance according to claim 1, wherein the pentaerythritol forms 5% to 90% of the mass of the components added to the water.

8. The method of the production of the fire impregnation substance according to claim 1, wherein the water forms 30% to 96% of the mass of the solution after both components have been mixed into it.

9. A fire impregnation substance comprising:
   a polymer of pentaerythritol and ammonium polyphosphate dissolved in water, wherein the water forms 30% to 96% of a mass of an overall resulting solution.

10. The fire impregnation substance according to the claim 9, wherein mutual ratio of components pentaerythritol and ammonium polyphosphate before their polymerization is from 1:18 to 18:1.

11. A method for the treatment a cellulose or a wood fibrous construction product comprising using an impregnation substance according to claim 9 on a surface of a cellulose or wood fibrous particles before their pressing or gluing into the cellulose or a wood fibrous construction product.

12. The method according to claim 11, wherein the wood fibrous product is chipboard or a particle board.

13. The method according to claim 12, wherein during the pressing of the cellulose or wood fibrous product, the product is heated to the temperature higher than 100° C. and lower than the temperature of an intumescence or microintumescence of the fire impregnation substance.

14. The method according to claim 13, wherein during the pressing of the cellulose or wood fibrous product the product is heated to the temperature from 174° C. to 190° C.

15. The wood fibrous product involving fire impregnation substance according to claim 9, wherein the wood fibrous product is pressed from oriented fibrous wood particles, mainly wood chips, wherein the fire impregnation element is in layers inside the product, in boundaries between the wood fibrous particles or cellulose particles, where the boundaries correspond to surfaces of the wood fibrous particles or cellulose particles before pressing.

* * * * *